(12) United States Patent
Ronk et al.

(10) Patent No.: US 7,999,060 B2
(45) Date of Patent: *Aug. 16, 2011

(54) TAILORABLE POLYIMIDE PREPOLYMER BLENDS, CROSSLINKED POLYIMIDES, AND ARTICLES FORMED THEREFROM

(75) Inventors: Warren Ronk, West Chester, OH (US); Lisa Shafer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 603 days.

This patent is subject to a terminal disclaimer.

(21) Appl. No.: 11/928,274

(22) Filed: Oct. 30, 2007

(65) Prior Publication Data

US 2008/0108781 A1 May 8, 2008

Related U.S. Application Data

(63) Continuation-in-part of application No. 11/757,683, filed on Jun. 4, 2007, which is a continuation-in-part of application No. 11/383,079, filed on May 12, 2006, and a continuation-in-part of application No. 11/383,086, filed on May 12, 2006, now abandoned, and a continuation-in-part of application No. 11/383,092, filed on May 12, 2006, and a continuation-in-part of application No. 11/383,100, filed on May 12, 2006, and a continuation-in-part of application No. 11/383,104, filed on May 12, 2006.

(51) Int. Cl.
*C08G 73/00* (2006.01)

(52) U.S. Cl. .......................... 528/353; 528/368; 525/418

(58) Field of Classification Search ................. 528/368, 528/353; 525/418
See application file for complete search history.

(56) References Cited

U.S. PATENT DOCUMENTS

| | | | | |
|---|---|---|---|---|
| 5,115,087 A | * | 5/1992 | Sheppard et al. | 528/322 |
| 5,708,128 A | * | 1/1998 | Oikawa et al. | 528/353 |
| 6,184,333 B1 | * | 2/2001 | Gray | 528/170 |

* cited by examiner

*Primary Examiner* — James Seidleck
*Assistant Examiner* — Gregory Listvoyb
(74) *Attorney, Agent, or Firm* — General Electric Company; Marcella R. Louke

(57) ABSTRACT

A tailorable polyimide prepolymer blend comprising an end group component, a dianhydride component, and a diamine component. The dianhydride component includes at least 3,4,3',4'-benzophenonetetracarboxylic dianhydride (BTDA), derivatives thereof, or combinations thereof, and 3,4,3',4'-biphenyltetracarboxylic dianhydride (BPDA), derivatives thereof, or combinations thereof. The diamine component includes at least 1,3-phenylenediamine (mPDA), derivatives thereof, or combinations thereof; 1,4-phenylenediamine (pPDA), derivatives thereof, or combinations thereof; bis amino phenoxy benzene (APB), derivatives thereof, and combinations thereof; and optionally, 4,4'-(1,3-phenylene-bis(1-methylethylidene)bisaniline (Bis-M), derivatives thereof, and combinations thereof. A cured polyimide matrix has a glass transition temperature of at least about 450° F. (232° C.). An article formed from the tailorable polyimide prepolymer blend may be a powder, a neat resin, a coating material, a film, an adhesive, a fiber, a composite, a laminate, a prepreg, a part, and combinations thereof.

19 Claims, No Drawings

TAILORABLE POLYIMIDE PREPOLYMER BLENDS, CROSSLINKED POLYIMIDES, AND ARTICLES FORMED THEREFROM

CROSS-REFERENCE TO RELATED APPLICATIONS

This application is a Continuation-in-Part of application Ser. No. 11/757,683 filed Jun. 4, 2007, which is a Continuation-in-Part of application Ser. No. 11/383,079, filed May 12, 2006; Ser. No. 11/383,086, filed May 12, 2006 now abandoned; Ser. No. 11/383,092, filed May 12, 2006; Ser. No. 11/383,100, filed May 12, 2006; Ser. No. 11/383,104, filed May 12, 2006; all of which are incorporated herein by reference in their entirety.

FIELD OF THE INVENTION

Embodiments disclosed herein relate generally to polyimide prepolymer blends, crosslinked polyimides, and articles formed therefrom. In particular, embodiments disclosed herein relate to tailorable prepolymer blends including an end group component, a dianhydride component, and a diamine component able to provide a crosslinked polyimide matrix.

BACKGROUND OF THE INVENTION

Addition-type polyimides, derived from end-capped polyimide oligomers, typically undergo thermal cross-linking or chain extension to form a crosslinked polyimide resin. Addition-type polyimides provide suitable matrix materials for high temperature polymer matrix composites due to their desirable heat resistance, desirable mechanical properties, desirable tribilogical properties, high chemical resistance and high radiation resistance. However, the processibility of given polyimides are limited and the range of properties are limited to the particular type of polyimide fabricated.

High temperature parts, such as gas turbine engine components are typically fabricated by a hand lay-up method. The hand lay-up method typically includes positioning a prepreg fiber onto a mold and pouring a liquid resin onto the fiber. The curing typically takes place at room temperature and the blend is rolled to work out any air bubbles and to fully distribute the resin. In addition, the manipulation of the resin to remove air bubbles and to distribute the resin may result in damage to the fibers making up the composite. This method suffers from the drawback that the processing method is labor intensive and suffers from high costs. Alternative methods, such as resin film infusion (RFI), are desirable techniques due to the decreased labor costs related to performing RFI and the reproducible parts that may be achieved. The curing typically takes place at elevated temperatures in an autoclave and the cure is done in a vacuum bag under high pressure (typically 100-200 psi) in order to make the resin flow and remove entrapped air and condensable gases. However, conventional polyimide oligomers lack the processability required for fabrication of parts using RFI. For example, known polyimides typically include a high melting or low molecular weight powder, but lack the flexibility of the combination of melting temperature and molecular weight that is desirable for processing techniques, such as RFI.

Currently, addition-type polyimides are used either as a monomeric solution (e.g., PMR-15 monomeric solutions) which reacts in a 2-step fashion to form a crosslinked system or as preimidized powders which melt prior to crosslinking to again form a crosslinked system. Monomeric solutions of prepolymer polyimides typically include a diamine, a dianhydride and an end blocking agent having a crosslinkable group. PMR-15, for example, is a reaction product of monomethyl ester of 5-norbornene 2,3-dicarboxylic acid, dimethyl ester of 3,3',4,4'-benzophenone tetracarboxylic acid and 4,4' methylenedianiline (MDA). PMR-15 is a material that has found extensive use in gas turbine engine component manufacture. However, the partially unreacted solutions of PMR-15 include MDA, which is a known carcinogen and is a known liver and kidney toxin. Fully reacted under cured PMR-15 compound mixtures no longer contain MDA and are less hazardous to handle. Nonetheless, while the properties of PMR-15 are suitable for use in the fabrication of higher temperature gas turbine engine parts, the use of MDA during the fabrication of the polyimide resin significantly increases costs and processing complexity.

What is needed is a polyimide prepolymer and crosslinked polyimide system that includes properties that may be tailored to particular applications and are fabricated by methods that include less hazardous chemicals. Further, what is needed is a method for fabricating polyimide materials that reduces or eliminates the requirement for hazardous and/or carcinogenic materials.

SUMMARY OF THE INVENTION

Exemplary embodiments disclosed herein provide a tailorable polyimide prepolymer blend comprising an end group component, a dianhydride component, and a diamine component. The end group component includes at least a reactive end-capping agent, a non-reactive end-capping agent, or combinations thereof. The dianhydride component includes at least 3,4,3',4'-benzophenonetetracarboxylic dianhydride (BTDA), derivatives thereof, or combinations thereof, and 3,4,3',4'-biphenyltetracarboxylic dianhydride (BPDA), derivatives thereof, or combinations thereof. The diamine component includes at least 1,3-phenylenediamine (mPDA), derivatives thereof, or combinations thereof; 1,4-phenylenediamine (pPDA), derivatives thereof, or combinations thereof; bis amino phenoxy benzene (APB), derivatives thereof, and combinations thereof; and optionally, 4,4'-(1,3-phenylene-bis(1-methylethylidene)bisaniline (Bis-M), derivatives thereof, and combinations thereof.

Exemplary embodiments disclosed herein include a crosslinked polyimide matrix formed after cure under suitable cure conditions of the tailorable polyimide prepolymer blend having a glass transition temperature of at least about 450° F. (232° C.). Other exemplary embodiments disclosed herein include a crosslinked polyimide matrix having a glass transition temperature of at least about 525° F. (about 273° C.).

Exemplary embodiments disclosed herein include an article formed from the tailorable polyimide prepolymer blend. The article may be selected from the group consisting of a powder, a neat resin, a coating material, a film, an adhesive, a fiber, a composite, a laminate, a prepreg, a part, and combinations thereof.

DETAILED DESCRIPTION OF THE INVENTION

Embodiments disclosed herein provide polyimide systems that simultaneously offer low toxicity, a high glass transition temperature, excellent thermal oxidative stability, and desirable processing characteristics. Furthermore, embodiments disclosed herein provide tailorable polyimide systems wherein relative amounts of starting materials may be altered to achieve desired outcomes. Embodiments disclosed herein include mixtures of monomeric reactants, polyimide-precursor reaction products, polyimides, and polyimide-containing articles.

In an exemplary embodiment, a mixture of monomeric reactants, or derivatives thereof, includes at least one end-capping agent, a selection of at least two aromatic dianhydrides, and a selection of at least two diamines. The selection of dianhydrides and diamines, and their relative molar ratios, are considered with respect to the desired property outcomes such as molecular weight, processibility, high temperature performance, and the like.

End-group components may include structures that are capable of forming oligomer compounds and capable of crosslinking in an addition polymerization reaction to form a crosslinked polyimide structure. Crosslinkable-group-containing end blocking agents of various kinds are usable depending on the synthesis process of the polyimide, including monoamines and dicarboxylic acid anhydrides as representative examples. A variety of crosslinkable groups may be selected in accordance with molding or forming conditions.

The crosslinkable group structures contained in the end groups may include ethynyl groups, benzocyclobuten-4'-yl groups, vinyl groups, allyl groups, cyano groups, isocyanate groups, nitrilo groups, amino groups, isopropenyl groups, vinylene groups, vinylidene groups, and ethynylidene groups.

The above described, crosslinkable-group-containing end blocking agents can be used either singly or in combination. Some or all of the hydrogen atoms on one or more of the aromatic rings of the end group containing material may be replaced by a like number of substituent groups selected from halogen groups, alkyl groups, alkoxy groups, and combinations thereof.

Exemplary end group components may include, but are not limited to, the following end group structures:

nadic end groups, including, but not limited to the following formula:

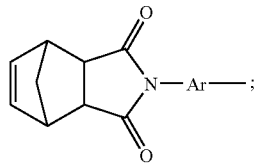

vinyl end groups including, but not limited to the following formula:

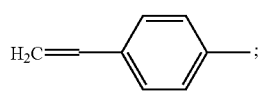

acetylene end groups including, but not limited to the following formula:

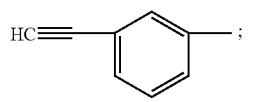

phenylethynyl end groups including, but not limited to the following formula:

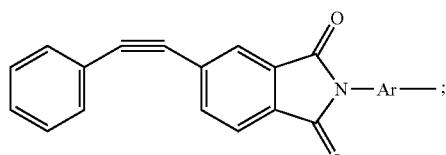

and mixtures thereof.

Ar as shown above in the nadic and phenylenthynyl end group structures may include aromatic groups, such as substituted or unsubstituted aromatic monocyclic or polycyclic linking structures. Substitutions in the linking structures may include, but are not limited to ethers, epoxides, amides, esters and combinations thereof.

The dianhydride component may include, but is not limited to, monomers having an anhydride structure, wherein an exemplary structure includes a tetracarboxylic acid dianhydride structure. The dianhydride component employed may be any suitable dianhydride for forming crosslinkable or crosslinked polyimide prepolymer, polymer or copolymer. For example, tetracarboxylic acid dianhydrides, singly or in combination, may be utilized, as desired.

Illustrative examples of aromatic dianhydrides suitable for use include: 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy) diphenyl sulfone dianhydride; 2,2-bis(4-(2,3-dicarboxyphenoxy)phenyl)propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,2,4,5-benzenetatracarboxylic dianhydride as well as mixtures comprising one of the foregoing dianhydrides.

Exemplary dianhydride components include the following dianhydride compounds:

3,4,3',4'-biphenyltetracarboxylic dianhydrides (BPDA) having the following formula:

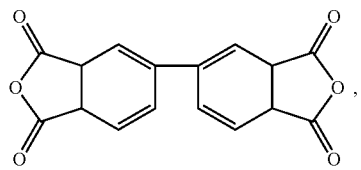

3,4,3',4'-benzophenonetetracarboxylic dianhydrides (BTDA) having the following formula:

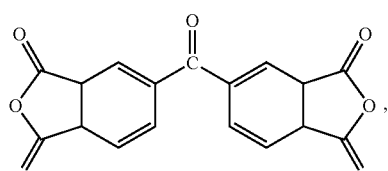

2,2-bis(3',4'-dicarboxyphenyl)hexafluoropropane dianhydrides having the following formula:

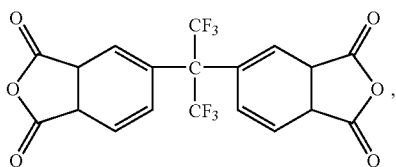

pyromellitic dianhydrides having the following formula:

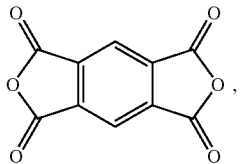

and mixtures thereof.

Depending on the fabrication process, tetracarboxylic acid monoanhydrides, tetracarboxylic compounds other than anhydrides, or their derivatives such as salts may also be used as desired instead of the above-recited dianhydrides. The dianhydride components, as described above, may be used either singly or in combination as needed.

The aromatic dianhydrides can be prepared by any suitable fabricating method known in the art. One suitable fabrication method for fabricating aromatic dianhydrides may include hydrolysis, followed by dehydration, of the reaction product of a nitro substituted phenyl dinitrile with a metal salt of dihydric phenol compound in the presence of a dipolar, aprotic solvent.

The diamine component may include, but is not limited to, an aromatic diamine monomer having the following formula:

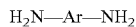

Ar as used in this formula preferably includes aromatic compounds, including substituted aromatic compounds and compounds having multiple aromatic rings. Substituent groups for substitution in the Ar group may include any suitable functional group, including, but not limited to halogen groups, alkyl groups, alkoxy groups, and combination thereof.

Examples of suitable diamine components may include, but are not limited to: 1,3-bis(aminophenoxy)benzene, 1,4-bis(aminophenoxy)benzene, 1,4-phenylenediamine ("para-PDA" or "pPDA"), 1,3-phenylene diamine ("meta-PDA" or "mPDA"), 4,4'-[1,3-phenylene bis(1-methyl-ethylidene)] bisaniline ("Bis aniline M" or "Bis-M"), ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3"-dimethylbenzidine, 3,3"dimethoxybenzidine, 1,5-diaminonaphthalene, bis(4-aminophenyl) methane, bis(2-chloro-4-amino-3,5-diethylphenyl)methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)sulfide, bis(4-aminophenyl)sulfone, bis(4-aminophenyl)ether, 1,3-bis(3-aminopropyl) tetramethyldisiloxane and mixtures comprising at least one of the foregoing organic diamines.

Further, these diamines are also usable in place of some or all of the hydrogen atoms on one or more of the aromatic ring(s) of each of the diamines. A like number of ethynyl groups, benzocyclobuten-4'-yl groups, vinyl groups, allyl groups, cyano groups, isocyanate groups, nitrilo groups and/or isopropenyl groups, which can act as crosslinking points, may also be introduced as substituent groups on the aromatic rings, preferably to an extent not impairing the moldability or formability.

In an exemplary embodiment, a tailorable polyimide prepolymer blend includes an end group component, a dianhydride component, and a diamine component. The end group component includes at least a reactive end-capping agent, a non-reactive end-capping agent, or combinations thereof selected from the end groups listed above. The dianhydride component includes at least 3,4,3',4'-benzophenonetetracarboxylic dianhydride (BTDA), derivatives thereof, or combinations thereof, and 3,4,3',4'-biphenyltetracarboxylic dianhydride (BPDA), derivatives thereof, or combinations thereof. The diamine component includes at least 1,3-phenylenediamine (mPDA), derivatives thereof, or combinations thereof, 4,4'-(1,3-phenylene-bis(1-methylethlidene)bisaniline (Bis-M), derivatives thereof, or combinations thereof, and 1,4-phenylenediamine (pPDA), derivatives thereof, or combinations thereof.

In exemplary embodiments, the end group component, the dianhydride component, and the diamine component are provided as a monomeric mixture. The mixture includes components capable of forming polyimide prepolymers having an end-capped oligomer structure and/or a crosslinked polyimide polymer or copolymer.

The relative amounts of the end group component, the dianhydride component, and the diamine component are selected in accordance with one or more desired physical or chemical properties of the prepolymer blend, or the crosslinked polyimide matrix, after cure under suitable cure conditions.

For example, glass transition temperature (Tg) is a measure of the ability of the polymer to maintain properties at elevated temperatures. Because bulk motion of the polymer is restricted below the Tg, the higher the Tg a material displays, typically, the higher the temperature capability of that material. Therefore, Tg of the crosslinked polyimide matrix may be a driving consideration in the make up of the prepolymer blend.

Melt viscosity is a measure of a fluids resistance to flow at temperatures above the melt point. For processing composites, it is generally desirable to have melt viscosities below 100,000 centipoise (cps) with the preferred range or 40,000 cps-800 cps wherein the melt viscosity is dependent upon the processing utilized. If the melt viscosity is not sufficiently low, processing requires excessive pressures in order to make the resin flow. Lower melt viscosities generally lead to greater processing options due to decreased pressure needs. Thus, a desired melt viscosity of the prepolymer blend may influence the respective amounts of the components in the prepolymer blend.

Thermal Oxidative Stability (TOS) is the ability of the polymer to withstand elevated temperatures in an oxygen-containing environment, such as air, with minimal loss of weight and/or properties. Turbine engine components often operate in high pressure as well as high temperature environments and the high pressure acts to increase the concentration of oxygen accelerating the deterioration of composite properties. Since, in a composite, compression strength is a resin-dominated property, the retention of compression strength after long-time exposures to high temperatures is monitored as a measure of TOS. Weight loss over time is also used as a measure. Polymers degrade through mechanisms, such as volatilization, resulting in a composite having reduced mass due to this loss of polymer. One test used herein to measure TOS includes placing a plaque of polymeric or composite material in a chamber, increasing the temperature and pressure within the chamber to a predetermined temperature and pressure, and holding these conditions for up to 150 hrs with multiple atmospheric changes over the course of the test. The plaques are then removed and tested for weight loss and retention of compression strength. The weight loss and retention of compression strength reflect service conditions in a turbine engine and provide a measure of the longer-term stability of the polymer material. A higher TOS is important for material that will be placed in a high temperature environment for long periods of time. The crosslinked polyimide copolymer preferably has a TOS of less than about 2.0% weight loss.

One embodiment includes utilizing the prepolymer blends in a resin film infusion (RFI) process. In RFI, a fiber containing preform is typically placed on a mold or other surface capable of providing the cured material with the desired geometry. A preferred fiber, particularly for aerospace applications, is carbon fiber. The fiber reinforcement of the preform is not limited to carbon fiber and may include any suitable fiber having high strength, sufficient stiffness, and relatively low density. The fiber for impregnation may be a fiber in any suitable form including, but not limited to uniaxial, braided, multi-layered, or woven forms. In addition, the fibers may be continuous fibers, chopped fiber, braided fiber, fiber fabric, woven fibers and noncrimp fabric, unitape fiber, fiber film or any suitable form of fiber that results in a reinforced composite material when cured. In addition, multiple types of fibers may be utilized in the preform.

The prepolymer blend may be placed as a film layer or layers on or within intermediate layers of the reinforcing fiber preforms to cover all or a majority of the preform. Alternatively, the film material, including the prepolymer blend, may be provided as at least a portion of the preform, wherein the material provided includes fibers onto which the resin blend has been placed into contact. The prepolymer blend resin material may be applied onto the entire surface of the reinforcing fiber preform. Alternatively, the matrix material may be interleaved between layers of the preform to cover all the layers of reinforcing fiber preform. Sufficient prepolymer material is provided to impregnate the preform during a heated resin infusion phase. Typically, the RFI method will include placing a barrier layer, such as a polytetrafluoroethylene barrier onto the prepolymer blend and/or prepreg material to assist in controlling the flow of resin. The perform and prepolymer blend may then be placed into a vacuum membrane or similar vacuum providing apparatus. The mold, fiber, resin, barrier layer and vacuum membrane may be placed into an autoclave or other controlled atmosphere device. The precise processing parameters utilized can vary and may depend upon the particular materials used as the first and second prepolymer components in the prepolymer blend.

In one embodiment, the temperature and pressure are increased within the autoclave, while simultaneously drawing a vacuum on the vacuum membrane. The increased temperature and vacuum facilitate the infiltration of the resin into the preform. The temperature and vacuum are maintained until the resin has sufficiently impregnated the preform to avoid the formation of voids. After infiltration, the temperature may be increased to begin crosslinking of the prepolymer blend. The specific parameters of the cure cycle vary and depend upon the particular materials used as the first and second prepolymer components in the prepolymer blend.

In an alternate embodiment, the polyimide prepolymer mixture may be processed using resin transfer molding (RTM). The materials utilized for the fiber reinforcement and the matrix are substantially the same as those used in the discussion of the RFI process above. However, in RTM, an injection system is utilized to inject the prepolymer mixture into a mold by pressurization of the prepolymer mixture. The mold, which has the substantial geometry of the finished component, includes the fiber preform. The pressurized prepolymer mixture impregnates the dry fibers of the fiber preform and is cured to crosslink the prepolymer mixture and form the final component. The specific parameters of the cure cycle vary and depend upon the particular materials used as the first and second prepolymer components in the prepolymer blend.

The prepolymer blend may be provided in any suitable form prior to curing. Forms that are particularly suitable include prepreg fiber materials, nanofiber filled tailorable polyimide resins, powder coated tow/preform infused with liquid.

In an exemplary embodiment, the molar ratio of the components is selected based on the desired properties of the prepolymer blend, the crosslinked polyimide matrix, or a combination thereof. For example, a first molar ratio may provide a desired melt viscosity of the blend that is appropriate for a chosen processing technique, such as RFI. A different molar ratio may be chosen if the desired property is a higher Tg of the crosslinked polyimide matrix.

In an exemplary embodiment the monomeric mixture includes an end group component, such as, but not limited to, NE, a dianhydride component, including BTDA, BPDA, and combinations thereof, and a diamine component including 1,3-phenylene diamine (meta-PDA), 1,4-phenylene diamine (p-PDA), and Bis-M. In an exemplary embodiment, the diamine component of the blend may further include a substitution of APB for a portion of the Bis-M. In an exemplary embodiment, up to about 10 mol % substitution of APB for Bis-M in the mixture of monomers is contemplated within the scope of the invention.

In an exemplary embodiment, the monomeric mixture exhibits desirable prepolymer properties such as melt viscosity and molecular weight. These properties may be varied depending on the respective amounts of the monomeric mixture components present in the blend. In certain applications, the prepolymer property may be a foremost consideration in selecting the types and molar ratios of the monomeric components.

In an exemplary embodiment, a crosslinked polyimide matrix formed from the monomeric mixture exhibits crosslinked properties such as thermal oxidative stability, glass transition temperature, molecular weight, and void content. These post-cure properties may also be varied depending on the respective amounts of the monomeric components present in the blend, prior to cure.

Other exemplary properties of the prepolymer blend, or the crosslinked polyimide matrix that may be varied include imidization temperature, maximum cure temperature, molecular weight distribution, tack, drape, ability to process using film infusion, ability to process using RTM, ability to modify the prepolymer blend with fillers or other agents, tensile strength, compression strength, inplane shear, and wet properties.

In an exemplary embodiment, a prepolymer blend comprising a first prepolymer component which may comprise a polyimide oligomer and a second prepolymer component that may comprise a polyimide oligomer, a mixture of monomers, or combination thereof, can be used as a roadmap to determine relative amounts of monomers to use in a "one pot" blend.

For example, the first prepolymer component may include a preimidized reaction product of a first blend of monomers. The second prepolymer component may include a preimidized reaction product, a blend of monomers, M, or a combination thereof. The properties of the prepolymer blends, i.e., melt viscosity, can be measured and optimized. Properties of the crosslinked polyimides, i.e., Tg, formed from curing the blends can be determined. After achieving desired outcomes in the prepolymer blends or crosslinked matrices, the theoretical molar ratio of monomer starting agents (generally dianhydrides, diamines, and end groups) can be determined from the ratios of the prepolymer components used. The monomers can then be imidized in a "one-pot" process for use as a neat resin, molding compound, film, prepreg, etc. Thus, cycle time for optimizing resin blends can be greatly reduced. Subsequent prepolymer blends can then be formulated from the monomers themselves.

In other embodiments, prepolymer blends may include a plurality of preimidized reaction products. The preimidized reaction products may be blended in various ratios to optimize desired outcomes.

Using the processes described above, prepolymer blends can be readily tailored to provide desired property outcomes in the blends and the crosslinked matrices.

EXAMPLE

A prepolymer mixture was formed from a blend of dimethyl ester of 3,3',4,4'-benzophenone tetracarboxylic dianhydride ("BTDA"), (4,4'-[1,3-phenylene bis(1-methyl-ethylidene)]bisaniline) ("Bis Aniline M"), paraphenylene diamine ("para PDA"), norbornene 2,3-dicarboxylic acid ("NE") and 3,3',4,4'-biphenyl -tetracarboxylic dianhydride (BPDA). The above blend was further mixed with a solid powder second prepolymer component having a reaction product of NE, BTDA, metaphenylene diamine (meta PDA), and Bis-Aniline M.

The liquid prepolymer component included the following molar compositional concentrations of monomers:
  30 mol % Bis Aniline M,
  12.9 mol % p PDA,
  28.6 mol % NE and
  varying mol % of BPDA and BTDA, as shown in TABLE 1, wherein the total mol % of the combination of BPDA and BTDA is 28.5 mol %.

TABLE 1

MOLAR COMPOSITIONS OF EXAMPLES 1-12

| Example | BTDA | BPDA | Bis Aniline M | p PDA | NE |
|---|---|---|---|---|---|
| 1 | 24.2% | 4.3% | 30.0% | 12.9% | 28.6% |
| 2 | 24.2% | 4.3% | 30.0% | 12.9% | 28.6% |
| 3 | 24.2% | 4.3% | 30.0% | 12.9% | 28.6% |
| 4 | 21.4% | 7.1% | 30.0% | 12.9% | 28.6% |
| 5 | 21.4% | 7.1% | 30.0% | 12.9% | 28.6% |
| 6 | 21.4% | 7.1% | 30.0% | 12.9% | 28.6% |
| 7 | 24.2% | 4.3% | 30.0% | 12.9% | 28.6% |
| 8 | 24.2% | 4.3% | 30.0% | 12.9% | 28.6% |
| 9 | 24.2% | 4.3% | 30.0% | 12.9% | 28.6% |
| 10 | 21.4% | 7.1% | 30.0% | 12.9% | 28.6% |
| 11 | 21.4% | 7.1% | 30.0% | 12.9% | 28.6% |
| 12 | 21.4% | 7.1% | 30.0% | 12.9% | 28.6% |

A solid powder prepolymer component was added to the liquid monomer mixture in Examples 1-12. The solid powder prepolymer component included a reaction product of the following components:
  40 mol % NE,
  20 mol % BTDA,
  28 mol % 1,3-phenylene diamine (meta PDA), and
  12 mol % bis-aniline M.

The reaction product forming the solid powder prepolymer component was a polyimide oligomer known in the art and is commercially available as a powder. One commercially available prepolymer corresponding to the above polyimide oligomer is MM 9.36 available from Maverick Corporation, Blue Ash, Ohio.

As shown in Table 2, the solid powder prepolymer was blended with the liquid monomer prepolymer to form a mixture that has the Molecular Weight ("MW") and the structural unit size ("n") shown in the Examples. Examples 1-6 included a MW of 2100 g/mol and a structural unit size of 3. Examples 7-12 included a MW of 1600 g/mol and a structural unit size of 2. The ratio between BTDA and BPDA was varied as shown in Table 1 and the amount of powder added was varied, as shown in TABLE 2.

The mixture was cured at a temperature of about 600° F. (316° C.) and a pressure of 200 psi for 4 hours. The glass transition temperature ("Tg") for the cured Examples are shown in TABLE 3. The cured sample was then subjected to a one of 2 post cures. The first post cure includes exposing the sample to a temperature of about 600° F. (316° F.) at ambient pressure for 12 hours. The Tg values for the first post cured Examples are shown in TABLE 3. The second post cure includes exposing the sample to a temperature of about 625° F. (329° C.) at ambient pressure for 12 hrs. The Tg values for the second post cured Examples are shown in TABLE 3.

In addition to the post curing, the samples were also measured for thermal oxidative stability (TOS). The TOS for Examples 1-12 are shown in TABLE 4. Likewise, the compression strength of the samples was measured after subjecting the samples to thermal cycling from room temperature to 550° F. (288° C.) for 380 cycles. The compression data is shown in TABLE 4.

As shown in Examples 1, 4, 7 and 10, a lower Tg and a higher TOS weight loss result from the presence of the liquid monomer mixture alone. The mixture of the liquid prepolymer component with the solid prepolymer component resulted in a Tg of greater than about 500° F. (260° C.) in the cured state and a thermal oxidative stability having a TOS weight loss of less than 2.0%. In the post cured state, the Tg of Examples reached 600° F. (316° C.) or greater.

TABLE 2

TAILORABLE POLYIMIDE RESINS NADIC END CAP

| Example | Liquid Formulated MW (g/mol) | n = | Monomer Substitution in Liquid Prepolymer Component** | Powder Prepolymer Component Addition |
|---|---|---|---|---|
| 1 | 2100 | 3 | 15% | 0% |
| 2 | 2100 | 3 | 15% | 15% |
| 3 | 2100 | 3 | 15% | 30% |
| 4 | 2100 | 3 | 25% | 0% |
| 5 | 2100 | 3 | 25% | 15% |
| 6 | 2100 | 3 | 25% | 30% |
| 7 | 1600 | 2 | 15% | 0% |
| 8 | 1600 | 2 | 15% | 15% |
| 9 | 1600 | 2 | 15% | 30% |
| 10 | 1600 | 2 | 25% | 0% |
| 11 | 1600 | 2 | 25% | 15% |
| 12 | 1600 | 2 | 25% | 30% |

**percent of BTDA substituted by BPDA in liquid Resin
MM 9.36 powder resin formulated MW = 936

TABLE 3

GLASS TRANSITION TEMPERATURE

| Example | As Cured Tg (° F.) | Post Cure 1 Tg (° F.) | Post Cure 2 Tg (° F.) |
|---|---|---|---|
| 1 | 478 | 530 | 551 |
| 2 | 501 | 551 | 589 |
| 3 | 530 | 576 | 595 |
| 4 | 488 | 531 | 553 |
| 5 | 500 | 556 | 583 |
| 6 | 532 | 579 | 606 |
| 7 | 514 | 552 | 563 |
| 8 | 520 | 561 | 590 |
| 9 | 545 | 580 | 606 |
| 10 | 501 | 552 | 578 |
| 11 | 516 | 572 | 590 |
| 12 | 532 | 584 | 609 |

TABLE 4

| Example | THERMAL OXIDATIVE STABILITY TOS Weight Loss (%) | COMPRESSION STRENGTH Compression (ksi) |
|---|---|---|
| 1 | 4.83 | 56.95 |
| 2 | 1.42 | 89.75 |
| 3 | 1.62 | 78.94 |
| 4 | 2.23 | 78.87 |
| 5 | 1.39 | 85.16 |
| 6 | 1.84 | 75.67 |
| 7 | 2.8 | 90.57 |
| 8 | 1.54 | 94.09 |
| 9 | 1.91 | 92.9 |
| 10 | 1.25 | 97.76 |
| 11 | 1.44 | 98.19 |
| 12 | 1.67 | 91.61 |

In an exemplary embodiment, an optimized resin blend is prepared from the monomers from which the initial prepolymer components were formed. For example, an optimized resin blend may include, in terms of molar ratio, about 2 (end group component):1.35 BTDA:0.35 BPDA:1.26 phenylene diamine (mPDA and pPDA):1.44 BisM. In an exemplary embodiment, the molar ratio may be 2 NE:1.35 BTDA:0.35 BPDA:0.42 mPDA:0.84 pPDA:1.44 BisM. It is envisioned that other end capping groups may be successfully utilized in this and other exemplary formulations.

In an exemplary embodiment, some or all of the Bis M may be substituted by bis amino phenoxy benzene (APB). The Bis M may be substituted 1 for 1, maintaining the remaining molar ratios. In an exemplary embodiment, it may be desirable to increase the molar ratio of a phenylene diamine (mPDA, pPDA, or both) upon substitution of APB for Bis M. An exemplary molar ratio formulation includes about 2 NE:about 1.35 BTDA:about 0.35 BPDA:about 1.26 total (mPDA and PPDA):about 1.44 (Bis-M, APB or APB and Bis-M). In an exemplary embodiment, with a substitution of at least some of the Bis M with APB, an exemplary molar ratio formulation includes about 2 NE:about 1.35 BTDA:about 0.35 BPDA: about 1.2 total (mPDA and PPDA):about 1.5 (APB or APB and Bis M). An exemplary molar ratio includes about 2 NE:about 1.35 BTDA: about 0.35 BPDA:about 1.7 total (mPDA and PPDA):about 1.0 (APB or APB and Bis M).

The molar ratio of total phenylene diamine (mPDA and PPDA) to APB may be in the range of from about 1.2:1.5 to about 1.7:1.0. An increase in the molar ratio of total phenyl diamine to APB may be utilized to maintain the Tg of the cured polyimide matrix with respect to a comparable polyimide matrix formed from a prepolymer blend without APB substitution.

In an exemplary embodiment a tailorable polyimide prepolymer blend includes the end group component (e.g., NE), the dianhydride component (e.g., BTDA and BPDA) and the diamine component (e.g., mPDA, pPDA, and APB or APB and Bis-M). Within the diamine component, the molar ratio of total (mPDA and PPDA) to (APB or APB and Bis-M) is in the range of about 1.2-1.7 (mPDA and PPDA):about 1.0-1.5 (APB or APB and Bis-M).

In other exemplary embodiments, the molar ratio of the end group component and/or the dianhydride component may also be varied to provide the desired tailorable properties of the prepolymer blend, the cure polyimide matrix, or both.

In an exemplary embodiment, a tailorable prepolymer blend has a molecular weight of between about 1,100 to about 2,100 g/mol. In an exemplary embodiment, a tailorable prepolymer blend has a molecular weight of between about 1,200 to about 1,600 g/mol.

In an exemplary embodiment, the end cap component, the dianhydride component, and the diamine component are present in respective amounts such that, prior to cure, the prepolymer blend provides at least one predetermined prepolymer blend property, and when cured under suitable cure conditions, the prepolymer blend provides a crosslinked polyimide matrix having at least one predetermined crosslinked matrix property.

For example, in an exemplary embodiment, the predetermined prepolymer blend property may be selected from a melt viscosity of the prepolymer blend (between about 1,000-20,000 cps); a molecular weight (between about 1,100 to about 2,100 g/mol); a maximum cure temperature (about 650° F.); suitable tack and/or drape for prepreg composites; processibility using RFI (with pressure at or below 200 psi and temperatures at or below about 650° F.); processibility using RTM (with pressures at or below 200 psi and temperatures at or below about 650° F.), and combinations thereof.

Further, in an exemplary embodiment, the predetermined crosslinked matrix property may be selected from a thermal oxidative stability (less than 4% weight loss when exposed to 555° F. and 50 psi for 1000 hours); a glass transition temperature (at least about 450° F. or at least about 525° F.) a void content (less than about 3%), room temperature tensile strength (at least about 100 ksi); room temperature compression strength (at least about 80 ksi); room temperature inplane shear (at least about 8 ksi), and combinations thereof.

In an exemplary embodiment, an article is formed from any of the exemplary tailorable polyimide prepolymer blends. The article may be a powder, a neat resin, a coating material, a film, an adhesive, a fiber, a composite, a laminate, a prepreg, a part, and combinations thereof.

Thus, embodiments disclosed herein provide tailorable polyimide prepolymer blends and crosslinked polyimide systems whose properties may be tailored to particular applications and are fabricated by methods that include less hazardous chemicals. In particular, the respective molar ratio of end group components, dianhydride components, and diamine components may be varied to produce the desired outcomes.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A tailorable polyimide prepolymer blend comprising:
    an end group component selected from the group consisting of a reactive end-capping agent, a non-reactive end-capping agent, and combinations thereof;
    a dianhydride component including 3,4,3',4'-benzophenonetetracarboxylic dianhydride (BTDA), derivatives thereof, and combinations thereof, and 3,4,3',4'-biphenyltetracarboxylic dianhydride (BPDA), derivatives thereof, and combinations thereof; and
    a diamine component including 1,3-phenylenediamine (mPDA), derivatives thereof, and combinations thereof, 1,4-phenylenediamine (pPDA), derivatives thereof, and combinations thereof, bis amino phenoxy benzene (APB), derivatives thereof, and combinations thereof, and optionally, 4,4'-(1,3-phenylene-bis(1-methylethylidene)bisaniline (Bis-M), derivatives thereof, and combinations thereof;
    wherein the molar ratio of (mPDA and pPDA) to the (APB or APB and Bis-M) is in the range of about 1.2-1.7 (mPDA and pPDA):1.0 -1.5 (APB or APB and Bis-M).

2. The tailorable polyimide prepolymer blend according to claim 1 wherein the end group component, the dianhydride component, and the diamine component are provided as a monomeric mixture.

3. The tailorable polyimide prepolymer blend according to claim 2 wherein the end group component, the dianhydride component and the diamine component of the monomeric mixture are present in liquid form.

4. The tailorable polyimide prepolymer blend according to claim 1 wherein in the prepolymer blend, the end cap component, the dianhydride component, and the diamine component are present in respective amounts such that, prior to cure, the prepolymer blend provides at least one predetermined prepolymer blend property, and when cured under suitable cure conditions, the prepolymer blend provides a crosslinked polyimide matrix having at least one predetermined crosslinked matrix property.

5. The tailorable polyimide prepolymer blend according to claim 4 wherein the at least one predetermined prepolymer blend property is selected from the group consisting of a melt viscosity of the prepolymer blend, a molecular weight of the prepolymer blend, a maximum cure temperature of the prepolymer blend, tack of the prepolymer blend in a prepreg, drape of the prepolymer blend, processability of the prepolymer blend using resin film infusion (RFI), and processability of the prepolymer blend using resin transfer molding (RTM).

6. The tailorable polyimide prepolymer blend according to claim 5 wherein, if selected:
    the melt viscosity is between about 1,000 to about 20,000 cp;
    the maximum cure temperature is about 650° F.;
    the prepolymer blend demonstrates suitable tack for prepreg composites;
    the prepolymer blend demonstrates suitable drape for prepreg composites;
    the prepolymer blend is processable using resin film infusion (RFI) with pressures at or below about 200 psi and process temperatures at or below about 650° F.;
    the prepolymer blend is processable using resin transfer molding (RTM) with pressure at or below about 200 psi and process temperatures at or below about 650° F.

7. The tailorable polyimide prepolymer blend according to claim 4 wherein the at least one predetermined crosslinked matrix property is selected from the group consisting of a thermal oxidative stability of the crosslinked polyimide matrix, a glass transition temperature of the crosslinked polyimide matrix, a void content of the crosslinked polyimide matrix, a tensile strength of the crosslinked polyimide matrix, a compression strength of the polyimide matrix, and inplane shear of the polyimide matrix.

8. The tailorable polyimide prepolymer blend according to claim 7 wherein in the crosslinked polyimide matrix, if selected:
    the thermal oxidative stability is below about 4% weight loss under conditions of 550° F. and 50 psi for 1000 hours;
    the glass transition temperature is at least about 525° F.;
    the void content is less than about 3%;
    the room temperature tensile strength is at least about 100 ksi;
    the room temperature compression strength is at least about 80 ksi;
    the room temperature inplane shear is at least about 8 ksi.

9. The tailorable polyimide prepolymer blend according to claim 1 wherein a molar ratio of mPDA to pPDA is about 0.42 (mPDA):0.84 (pPDA).

10. The tailorable polyimide prepolymer blend according to claim 1 wherein the end group component comprises at least a monomethyl ester of 5-norbornene 2,3-dicarboxylic acid (NE).

11. A crosslinked polyimide matrix formed after cure under suitable cure conditions of the tailorable polyimide prepolymer blend according to claim 1 having a glass transition temperature of at least about 450° F. (232° C.).

12. The crosslinked polyimide matrix according to claim 11 having wherein the glass transition temperature is at least about 525° F. (274° C.).

13. An article formed from the tailorable polyimide prepolymer blend of claim 1, wherein the article is selected from the group consisting of a powder, a neat resin, a coating material, a film, an adhesive, a fiber, a composite, a laminate, a prepreg, a part, and combinations thereof.

14. The article according to claim 13 comprising a prepreg, wherein the prepreg consists essentially of a fibrous substrate impregnated with the tailorable polyimide prepolymer blend.

15. A tailorable polyimide prepolymer blend comprising:
    an end group component selected from the group consisting of a reactive end-capping agent, a non-reactive end-capping agent, and combinations thereof;

a dianhydride component including 3,4,3',4'-benzophenonetetracarboxylic dianhydride (BTDA), derivatives thereof, and combinations thereof, and 3,4,3',4'-biphenyltetracarboxylic dianhydride (BPDA), derivatives thereof, and combinations thereof; and a diamine component including 1,3-phenylenediamine (mPDA), derivatives thereof, and combinations thereof, 1,4-phenylenediamine (pPDA), derivatives thereof, and combinations thereof, bis amino phenoxy benzene (APB), derivatives thereof, and combinations thereof, and optionally, 4,4'-(1,3-phenylene-bis(1-methylethylidene)bisaniline (Bis-M), derivatives thereof, and combinations thereof;

wherein the end group component, the BTDA, the BPDA, the mPDA, the pPDA, and the APB or APB and Bis-M are present in a respective molar ratio of about 2 (end group):about 1.35 (BTDA):about 0.35 (BPDA):about 1.2 -1.7 (mPDA and pPDA):about 1.0-1.44 (APB or APB and Bis-M).

16. An article formed from the tailorable polyimide prepolymer blend of claim 15, wherein the article is selected from the group consisting of a powder, a neat resin, a coating material, a film, an adhesive, a fiber, a composite, a laminate, a prepreg, a part, and combinations thereof.

17. The article according to claim 16 comprising a prepreg, wherein the prepreg consists essentially of a fibrous substrate impregnated with the tailorable polyimide prepolymer.

18. A prepolymer blend comprising:
a first prepolymer component comprising at least a first polyimide oligomer having the formula:

$E_1\text{-}[R_1]_n\text{-}E_1$; and a second prepolymer component, different from the first prepolymer component, selected from the group consisting of $M_1$, at least a second polyimide oligomer having the formula $E_2\text{-}[R_2]_n\text{-}E_2$, and combinations thereof;

wherein $R_1$ and $R_2$ independently comprise the following structure:

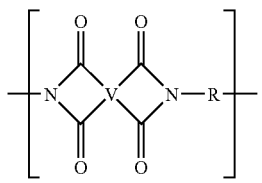

wherein n comprises from about 1 to about 5, wherein V is a tetravalent substituted or unsubstituted aromatic monocyclic or polycyclic linking structure, R is a substituted or unsubstituted divalent organic radical, $E_1$ and $E_2$ independently comprise crosslinkable functional groups, and wherein $M_1$ comprises a mixture of monomeric compounds including a diamine component comprising at least one diamine compound, a dianhydride component comprising at least one dianhydride compound, and an end group component comprising at least one end group compound;

wherein the polyimide oligomer of the first prepolymer component comprises a reaction product of at least one dianhydride selected from 2,3-3',4'-biphenyltetracarboxylic dianhydride (a-BPDA), derivatives thereof, and mixtures thereof, at least one diamine selected from an amino phenoxy benzene (APB), metaphenylene diamine (meta-PDA), derivatives thereof, and mixtures thereof, and an end group selected from phenyl ethynyl phtalic anhydride (PEPA), derivatives thereof, and mixtures thereof;

wherein the second prepolymer component comprises $M_1$, and wherein the dianhydride component is selected from the group consisting of a pyromellitic dianhydride, 3,4,3',4'-biphenyltetracarboxylic dianhydride (BPDA), 3,4,3',4'-benzophenonetetracarboxylic dianhydride (BTDA), derivatives thereof, and mixtures thereof, the diamine component is selected from the group consisting of 1,4-phenylenediamine (para-PDA), amino phenoxy benzene (APB), derivatives thereof, and mixtures thereof, and the end group component is selected from the group consisting of phenyl ethynyl phtalic anhydride (PEPA), derivatives thereof, and mixtures thereof;

wherein the prepolymer blend, prior to cure, provides at least one predetermined prepolymer blend property; and wherein the prepolymer blend, when cured under suitable cure conditions, provides a crosslinked polyimide matrix having at least one predetermined crosslinked matrix property; and wherein the first and second prepolymer components are blended in a ratio of from about 10:90 to about 40:60 based on mole percent.

19. A gas turbine engine component comprising the crosslinked polymer matrix of claim 18.

* * * * *